May 7, 1940.   W. D. LOUGHLIN   2,199,669
TUNED TRANSMISSION CIRCUITS
Filed Dec. 22, 1931   6 Sheets-Sheet 1
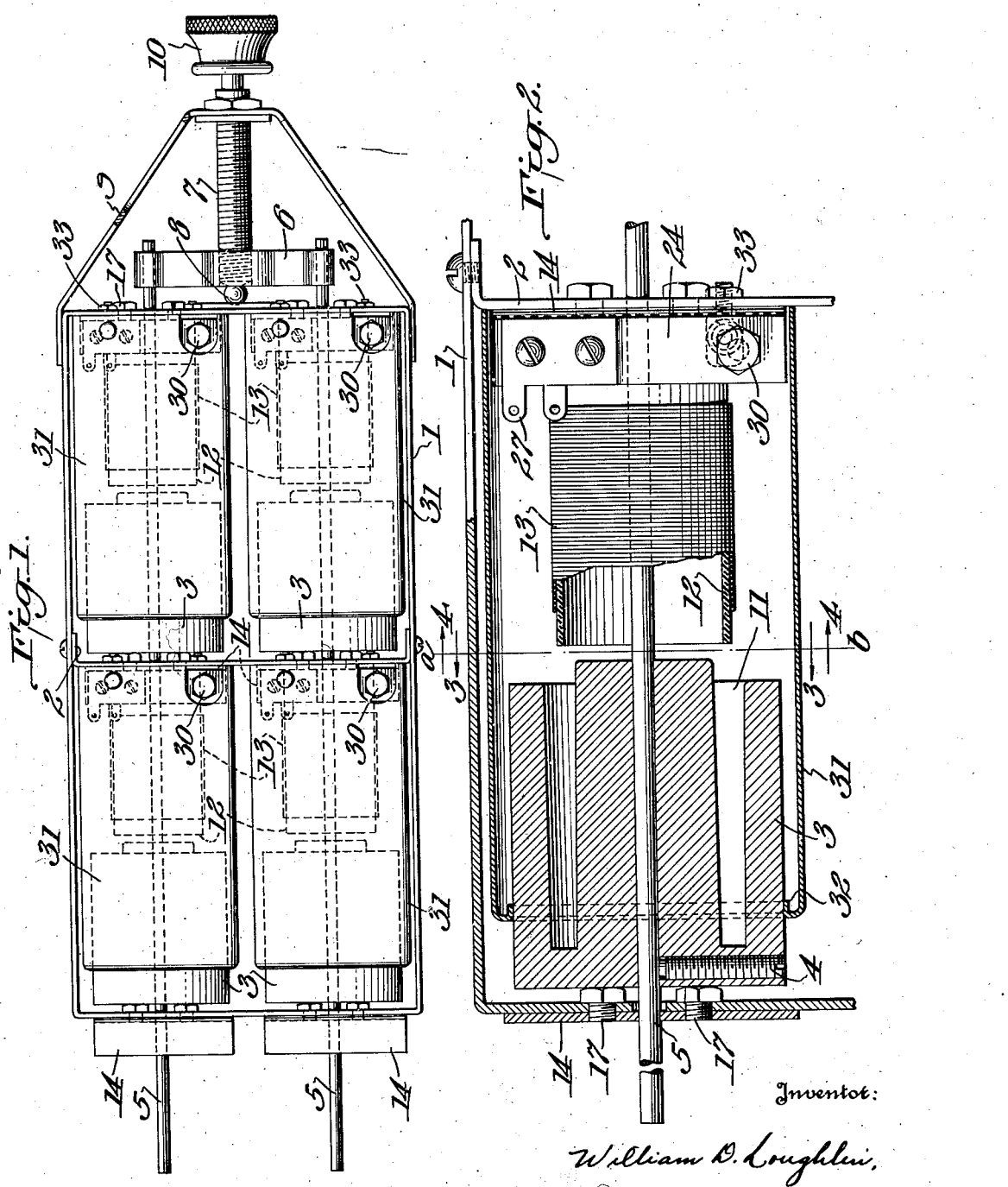
Inventor:
William D. Loughlin,
By Byrnes, Townsend & Potter,
Attorneys.

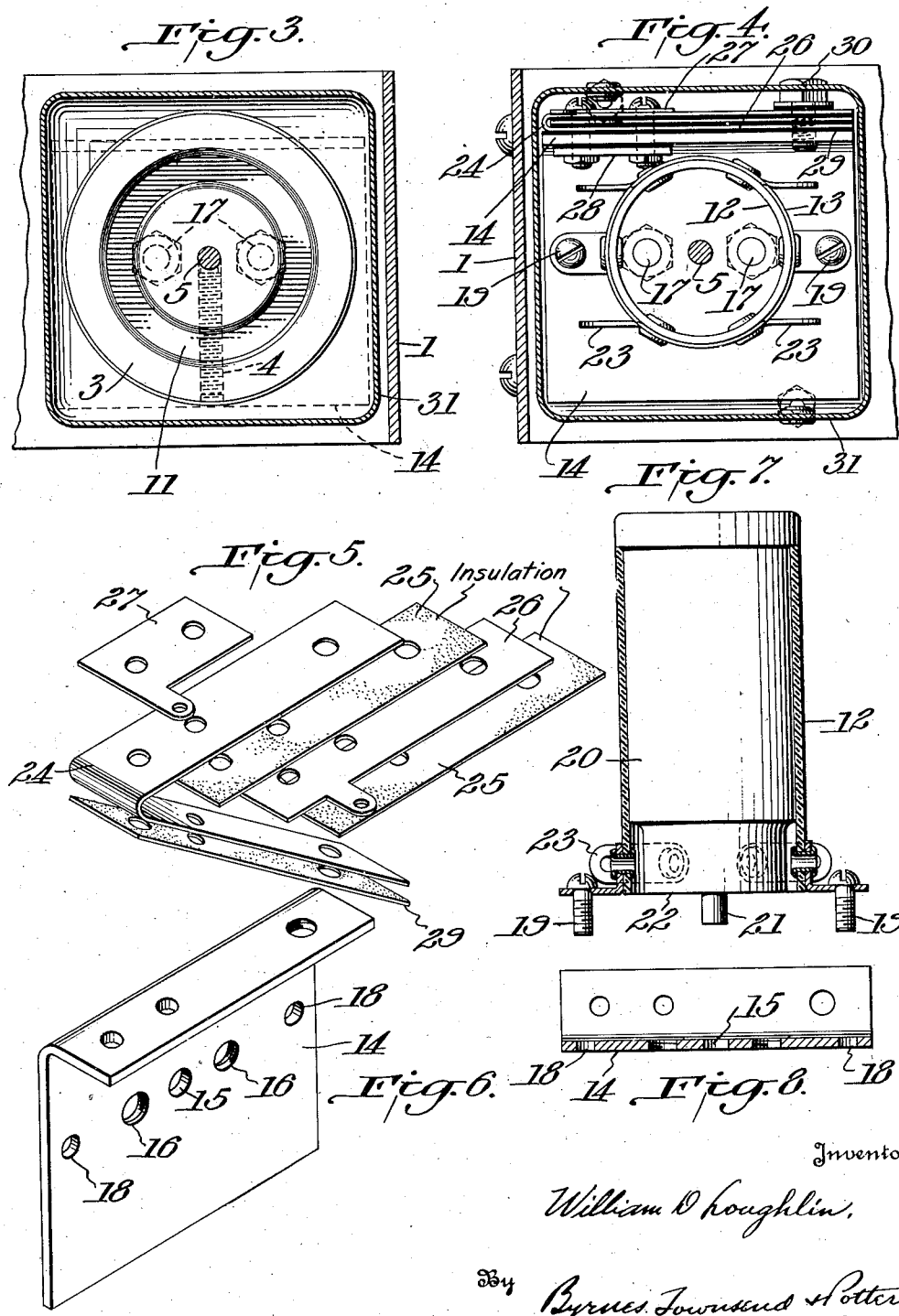

May 7, 1940.  W. D. LOUGHLIN  2,199,669
TUNED TRANSMISSION CIRCUITS
Filed Dec. 22, 1931  6 Sheets-Sheet 3

Inventor:
William D. Loughlin,
By Byrnes, Townsend & Potter
Attorneys.

May 7, 1940.  W. D. LOUGHLIN  2,199,669
TUNED TRANSMISSION CIRCUITS
Filed Dec. 22, 1931  6 Sheets-Sheet 4
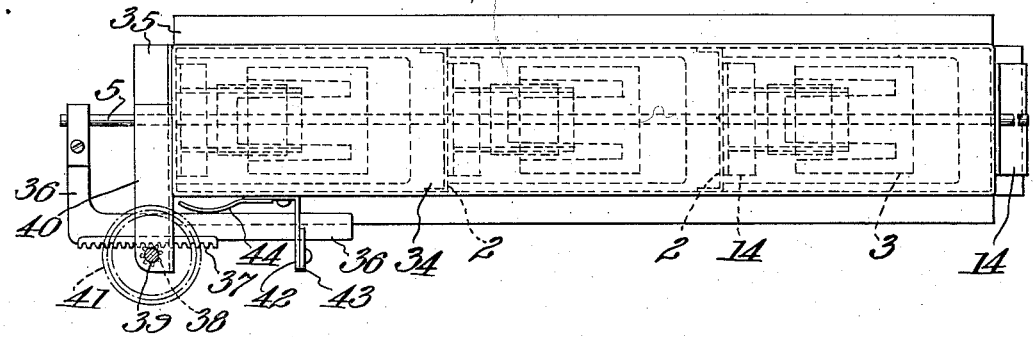
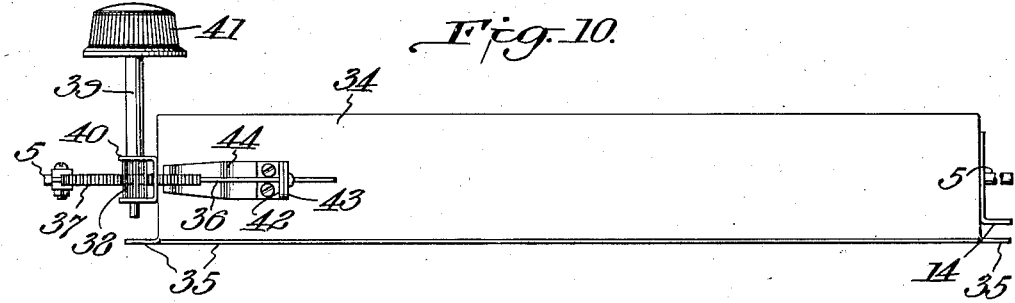
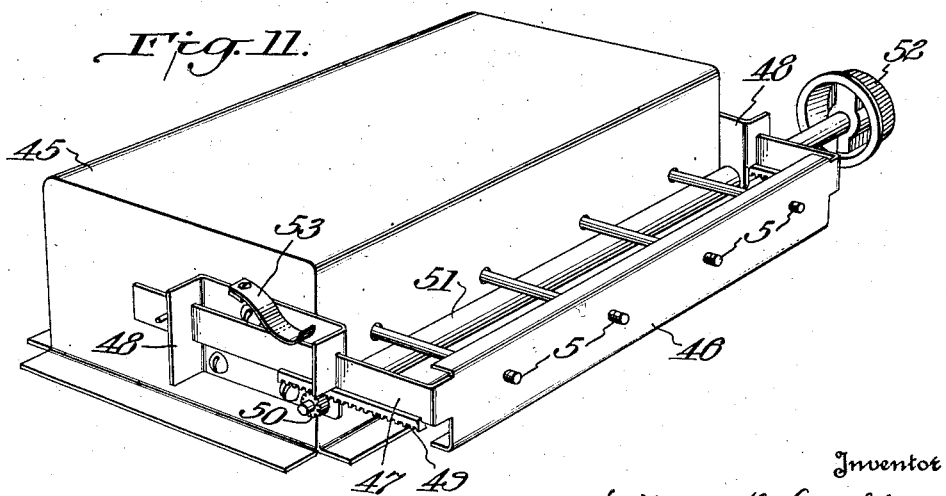
Inventor:
William D. Loughlin,
By Byrnes, Townsend & Potter,
Attorneys.

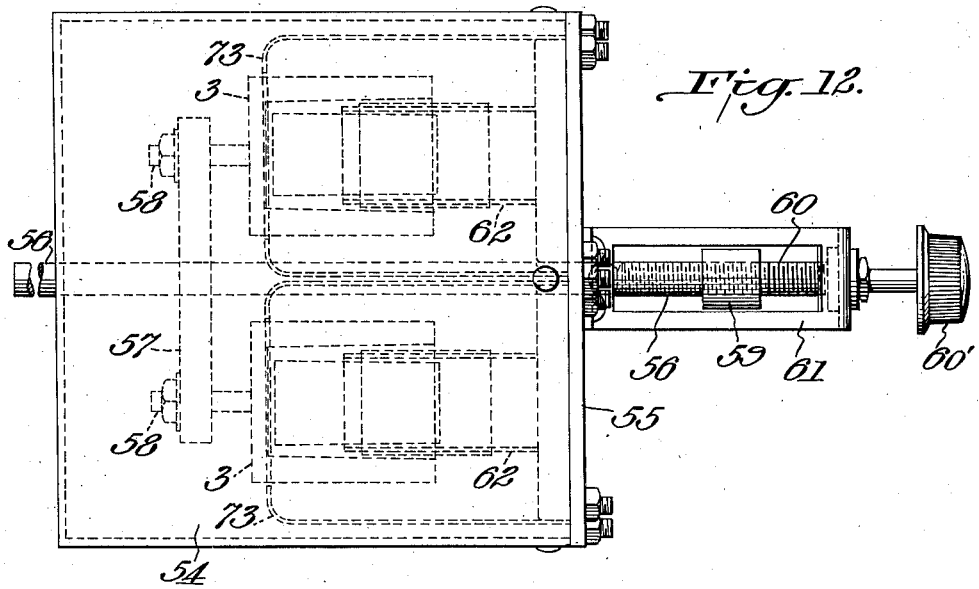
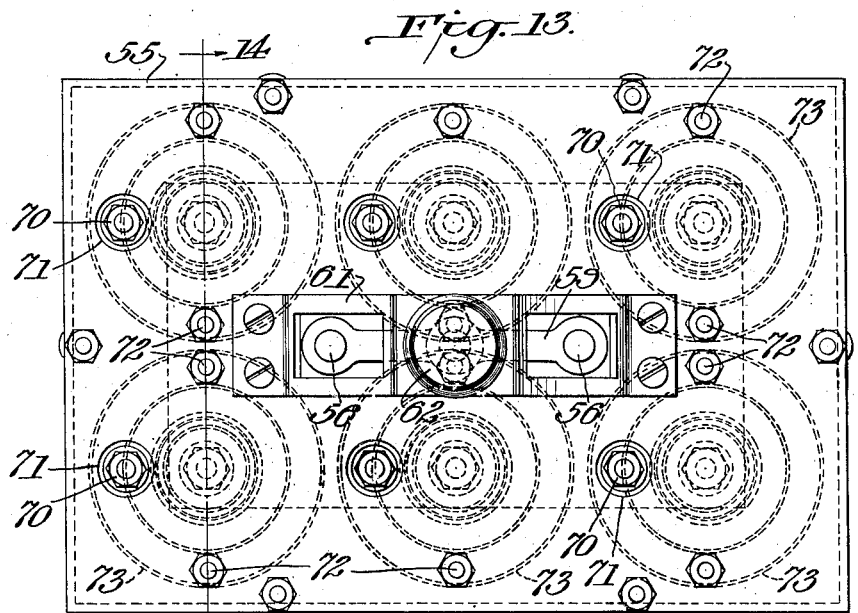
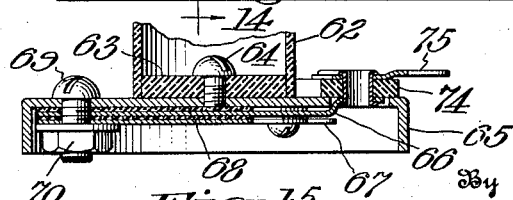

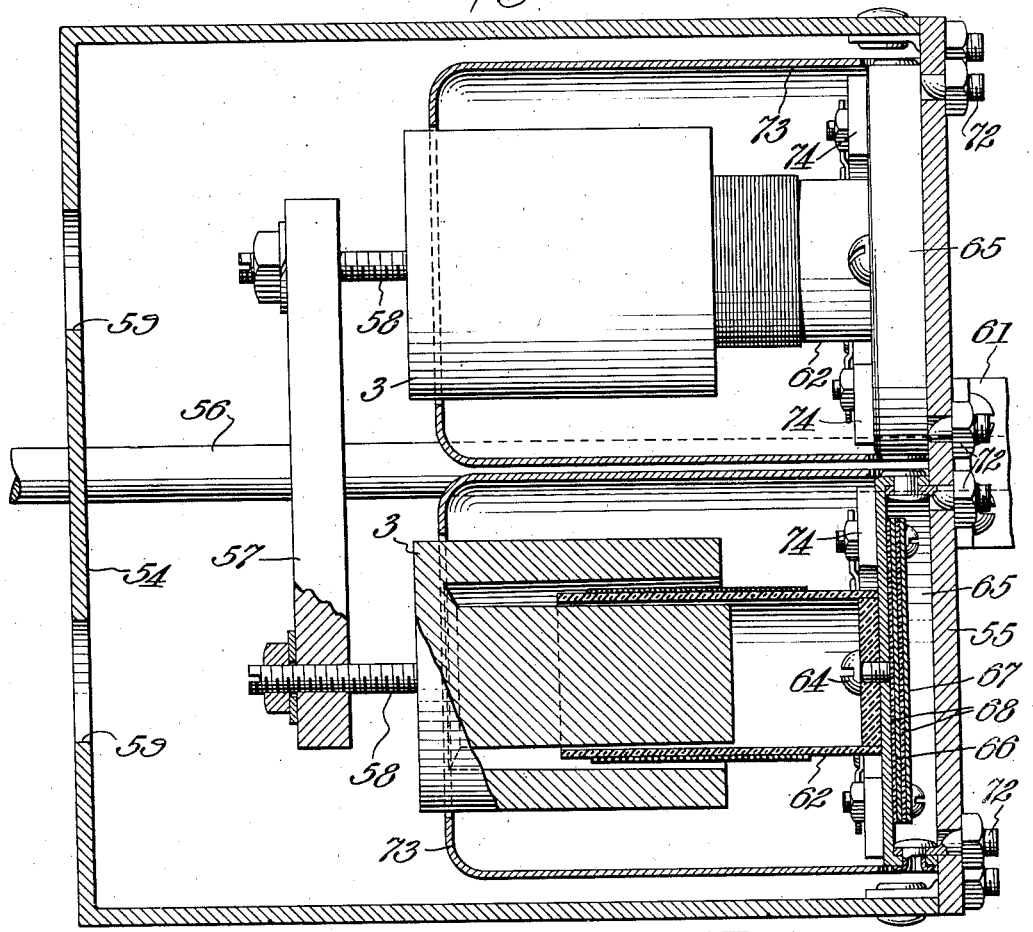
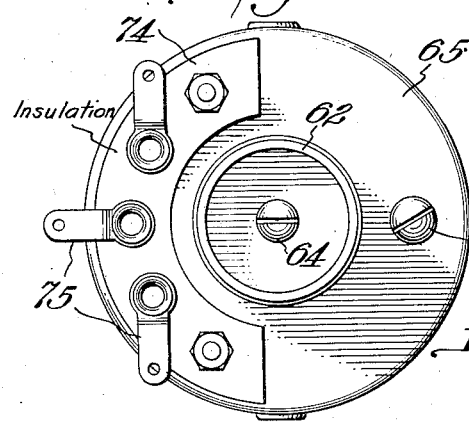
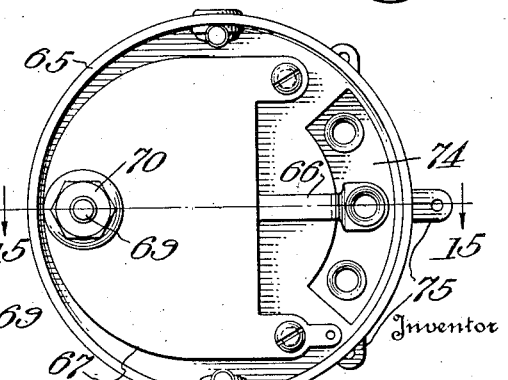

Patented May 7, 1940

2,199,669

UNITED STATES PATENT OFFICE 2,199,669

TUNED TRANSMISSION CIRCUITS

William D. Loughlin, Mountain Lakes, N. J., assignor, by mesne assignments, to Radio Corporation of America, New York, N. Y., a corporation of Delaware Application December 22, 1931, Serial No. 582,632

7 Claims. (Cl. 250—40)

This invention relates to tuned transmission circuits and more particularly to circuits of the type in which the resonant frequency is determined by adjustment of the position, in the magnetic field of an inductive element of the circuit, of an armature that has a permeability greater than unity for alternating magnetic fields.

Circuits of this type are commonly known as "iron-tuned" circuits and, as a matter of convenience, that term will be employed in the following specification and claims but it is to be understood that tuning armature may include a metal or alloy other than iron.

The mechanical construction previously employed for iron-tuned circuits have included fixed tuning armatures and movable coils. Individual tuned circuits exhibit desirable electrical characteristics but considerable difficulty has been experienced in alining a plurality of circuits that are to be tuned simultaneously by an adjustment of the coils with respect to stationary armatures.

An object of the invention is to provide an improved mechanical construction for a tuning system of the type including magnetic armatures or cores. A further object is to provide a tuning system of the type stated in which the tuning armatures are mounted on a movable carriage, the carriage being adequately supported and guided for substantially rectilinear movement. Further objects relate to the provision of jigs for the accurate mounting of a plurality of inductance coils in substantially parallel and/or coaxial relation. Further objects relate to the provision of improved electrical circuits for use with resonant circuits of the iron-tuned type and to methods of alining such resonant circuits for gang tuning.

Figure 18:
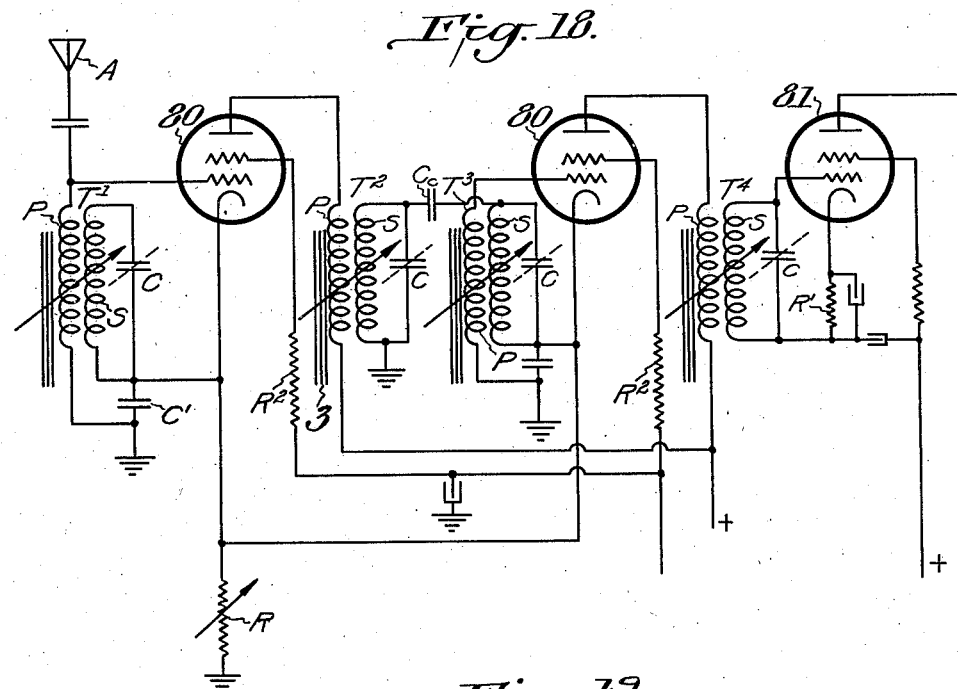
Figure 19:
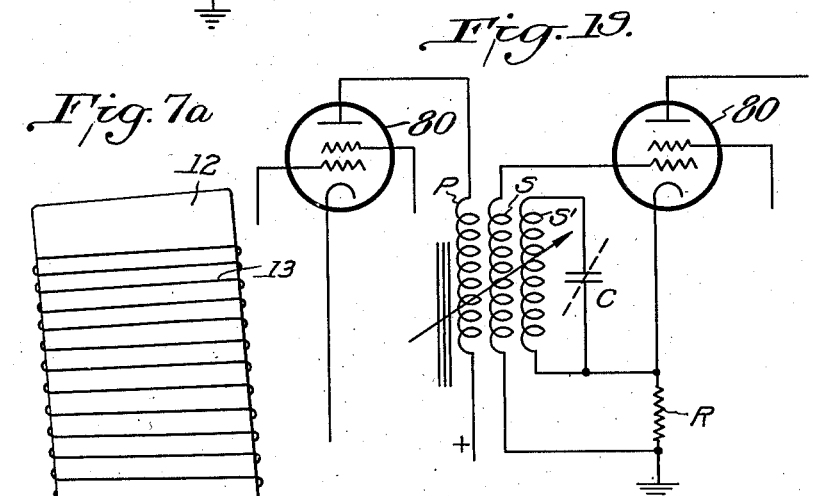
Figure 7A:
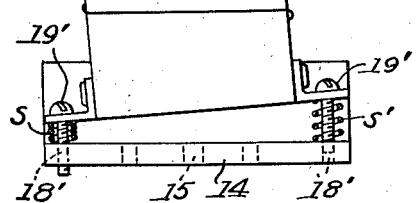

These and other objects of the invention will be apparent from the following specification, when taken with the accompanying drawings, in which, Fig. 1 is a plan view of one embodiment of the invention, Fig. 2 is a fragmentary horizontal section through one tuning unit of the multi-stage tuner shown in Fig. 1, Figs. 3 and 4 are vertical sections on line *a—b* of Fig. 2, as viewed in the directions indicated by arrows 3—3 and 4—4, respectively, Fig. 5 is an expanded perspective view of a double condenser unit, Fig. 6 is a perspective view of the mounting plate which supports the double condenser and the coil assembly, Fig. 7 is a central section through a coil form mounted on a mounting jig, Fig. 7a illustrates a modified mounting for the coil, Fig. 8 is a similar central section through the mounting plate, Figs. 9 and 10 are a side and a plan view, respectively, of another embodiment of the invention, Fig. 11 is a perspective view of another form of multiple unit assembly, Figs. 12 and 13 are side and end views of another multiple unit assembly, Fig. 14 is a vertical section on line 14—14 of Fig. 13, Fig. 15 is a fragmentary central section of a coil form and mount, as taken on line 15—15 of Fig. 17, Figs. 16 and 17 are top and bottom views, respectively, of a coil form and mount, and Figs. 18 and 19 are fragmentary circuit diagrams of a radio receiver including a plurality of iron-tuned circuits.

In the four unit assembly illustrated in Figs. 1 to 8, inclusive, the numeral 1 identifies a rectangular frame which may be, and preferably is, formed of a relatively heavy steel plate. A steel strap 2 is secured across the frame, and two of the coil assemblies are secured to the strap and two are secured to an end bar of the frame. The coil assemblies are arranged in two longitudinally alined sets, and the tuning elements 3 are similarly alined and adjustably secured, by set screws 4, to a pair of brass rods 5 which extend beyond each end of the frame 1. At one end, the rods 5 are rigidly secured to a yoke 6 into which the adjusting screw 7 is threaded. The adjusting screw is rotatably supported, and without end play, between a ball bearing 8 that seats in a depression in the frame 1, and a strap 9 that is fixed to the frame. The outer end of screw 7 is provided with an appropriate operating means, such as a tuning knob 10.

As shown in Fig. 2, each moving element comprises a cylindrical body having a deep annular counterbore 11 providing a core and sleeve. For tuning to radio and intermediate frequencies, these tuning elements may comprise masses of finely divided iron which are accurately molded to the desired form by a binder that has the additional function of insulating the particles of iron from each other. The counterbore 11 permits the coil form 12, with its winding or windings 13 to enter between the core and sleeve sections of the tuning element 3.

The rods 5 pass loosely through the end bars of frame 1 but are accurately guided in bearing openings in the plates 14 secured to corresponding faces of the end straps of frame 1 and the cross strap 2.

For convenience of manufacture, all of the plates 14 may be of identical form, being angle plates as shown in perspective in Fig. 6. The two plates 14 at the end of the frame opposite the adjusting screw 7 are "dummy" plates, while the remaining plates 14 carry the coil form 12 of the several units. In addition to the bearing apertures 15, each mounting plate 14 is provided with threaded openings 16 for receiving the screws 17 that secure the plates to the frame 1 and strap 2. By means of gang punches, the openings 15, 16 are accurately located in the plates 14. The plates 14 are also provided with openings 18 for receiving the bolts 19 that are used to attach the coil forms 12 to the mounting plates. As shown in Fig. 7, each coil form 12 is accurately mounted on its plate 14 by means of a jig 20 that comprises a cylinder which has a snug fit within the coil form, and a cylindrical projection 21 that fits snugly within the bearing opening 15 of the plate 14. The method of mounting the coil forms on the plates will be apparent from Figs. 7 and 8 which, while separate views, indicate the relative position of the parts as the coil form is applied to its plate. The end face 22 of the jig 20 is accurately turned to a surface normal to the axis of the extension 21 and, when the jig 20 is pressed firmly against the plate 14, the axis of the coil form is normal to the surface of the plate 14. When this condition obtains, nuts are applied to bolts 19 to secure the coil form to the mounting plate. The coil forms are provided, as is customary, with soldering lugs 23 for completing the electrical circuits to the windings on the form.

The angle or top flange of the plate 14 provides a mounting for and constitutes one electrode of a double condenser assembly which is particularly useful in resonant circuits of the iron-tuned type. As shown in Fig. 5, this double condenser includes a bent strip 24 of copper or other metal having some resilience; insulating strips 25 of mica and a second plate 26 being arranged between the sections of the strip 24. A soldering lug is formed on plate 26, but a separate plate 27 bearing a soldering lug is preferably arranged above the folded end of the bent strip 24. The assembled condenser unit is illustrated in Fig. 4. A plate 28 is arranged below and insulated from the flange of mounting plate 14, and screws are passed through the assembly to flex the lower fold of the strip 24 towards the insulating strip 29 and the flange of plate 14. A headed bolt 30 passes through the opposite ends of plates 24, 26, being insulated therefrom, and enters a threaded opening in the flange. Turning down of the bolt 30 flexes the free ends of plate 24 towards plate 26, thus increasing the capacity between these plates.

The inductances on the several coil forms 12 are shielded from each other by aluminum or copper tubes 31 that have a length somewhat less than the maximum length of each tuning unit. The free ends of the tubes are preferably provided with internal flanges 32 which may assist in guiding and supporting the relatively heavy iron tuning elements 3. At their opposite ends, screws are riveted to the tubes and, passing through the center strap 2 or the end strap of frame 1, receive nuts 33 for securing the cans to the frame.

In adjusting the assembly to effect the simultaneous tuning of the several units to the same frequency, the adjusting knob 10 is first turned to move the armatures to the position shown in Figs. 1 and 2, i. e., the armatures are moved to the position in which they exercise a minimum influence upon the inductance of the several coils or transformers. With ferro-magnetic armatures this will be the position of maximum frequency, i. e., the high frequency end of the tuning range. The several shunt capacities are then adjusted, by means of the bolts 30, to bring all units into resonance at the wave length lower limit of the frequency band. The inductances 13 or coil forms 12 serve as the measure for determining the magnitude of the several shunt capacities which constitute the fixed elements of the tuning units; thus distinguishing from the prior practice with respect to capacitively tuned circuits in which the fixed elements, i. e., the inductances, are carefully equalized before any attempt is made to adjust the variable element or tuning capacities of the units. Having adjusted the capacities to aline the units at the wave length lower limit of the band of frequencies, the knob 10 is manipulated to bring the armatures within the coils and the several armatures are then adjusted longitudinally of the supporting carriage to bring all units into resonance at one frequency. All units are then exactly syntonized at two different positions of the tuning control, and in general, will be substantially in resonance with each other throughout the entire tuning range.

It is obvious that this process of adjustment in general produces perfect syntonism between the several tuned circuits at all positions of the armature provided that the following two conditions are fulfilled: (1) the initial inductances of the coils are equal with the armatures all the way out of the field; (2) the physical arrangement of the system is such that the rate of change of inductance with displacement of the magnetic armature is the same for each unit. In practice it may be desirable to preserve tuning alignment with inductances which are not precisely equal at the high frequency end, or conversely to preserve alignment with an armature system wherein the inductance of one unit varies more rapidly than the inductance of another. The electrical requirement for tuning alignment is that the products of the inductances of all the coils by the capacities of their respective shunt condensers shall be equal at each position of the tuning control. Suppose one coil has a larger initial inductance than another. At the high frequency end of the band the fixed tuning capacities connected across these coils will be adjusted to the same ratio, inversely to each other as the inductances of their respective coils. Then to preserve tuning alignment over the band, it will be necessary for this initial ratio between the coil inductances to be preserved at all positions of the armature. In other words, if one inductance is 1.05 times as large as another at the high frequency end, the functional relation between inductance and position of the tuning control must be so chosen or adjusted that the first inductance varies 1.05 times as fast as the second throughout the tuning range. The tuning system described above is designed to facilitate such arrangements. For example, I may predetermine the rate of change of inductance with position of the tuning control by the use of ferro-magnetic armatures having different values of permeability for different units of the same assembly. Or I may, by adjusting the mounting screw, vary the angles which the coil forms 12 make with the direction of travel of the tuning armatures as shown in Fig. 7a.

In said last-mentioned figure, the mounting screws 19' are provided with springs S, S' respectively, which are interposed between plate 14 and the screw-heads. The holes 18' in the arrangement shown in Fig. 7a are threaded so as to provide for adjusting the screws 19'. It is believed to be obvious from a study of the drawings that the angle which the coil form 12 makes with the direction of travel of its tuning armature may be adjusted by simply screwing down one of the screws 19' more than the other.

Where but three tuned circuits are required, the assembly shown in Figs. 9 and 10 may be employed to advantage. The construction of the individual units may be, and preferably is substantially identical with that previously described.

In place of an open frame, the several units are mounted in a chassis 34 having the form of a steel box open at the bottom, and having flanges 35 for securing the box to the main chassis of the receiver. Cross straps 2 extend across the box frame 34, and the mounting plates 14 are secured to the cross straps and to one end of the box, the flanged ends of the several plates being at the open bottom of the box to permit access to the condenser adjusting bolts through openings in the chassis plate to which the box frame 34 is secured.

The carriage rod 5 is, as previously described, slidably mounted in the several mounting plates and in a dummy plate 14 at the exterior of box 34. The opposite end of the rod 5 has an L-shaped strap 36 rigidly secured thereto, and an accurately cut rack 37 is formed on or secured to the strap 36. The rack 37 is engaged by a pinion 38 on shaft 39 that is journaled in bracket 40 and carries an adjusting knob 41. The free end of strap 36 passes through a slot in an angle bracket 42, and an adjustable guide plate 43 on bracket 42 extends across one end of the slot in the bracket. A leaf spring 44 on bracket 42 presses the strap 36 into engagement with the guide plate 43, and, by suitable adjustment of the plate, the rod 5 is guided for straight line motion.

In place of the described tandem arrangement of the several tuning units, a parallel arrangement may be employed when due precaution is taken to prevent inadvertent yawing of the several iron elements. As shown in Fig. 11, the frame 45 for supporting the coil assemblies and the mounting plates (as previously described) for guiding rods 5 has the form of an open sided box.

The several rods 5 are parallel to each other and have their outer ends threaded into a cross bar 46 which has flanged ends 47 extending along the ends of the box frame 45 and guided in slots in brackets 48. The end flanges 47 of the cross bar 46 are provided with racks 49 that are engaged by pinions 50 on a sturdy shaft 51 that is journaled in flanges 48 and carries an operating device, as indicated by knob 52. Leaf springs 53 are secured to bosses on brackets 48 to hold the racks 49 in close engagement with the pinions 50.

As shown in Figs. 12 to 14, a different style of carriage for mounting the several iron tuning units may be employed. This type of mounting is to be preferred when a relatively large number of tuned circuits are required, but may, of course, be used with either more or less than the six units which are illustrated.

The mounting and general shield for the several units comprises a relatively heavy steel box 54 having a cover plate 55 secured thereto. The end wall and cover plate of the box are apertured to receive and accurately guide the rods 56 to which the supporting plate 57 is rigidly secured. The supporting plate is accurately bored and threaded to receive the bolts 58 to which the iron tuning units 3 are secured. The end wall of box 54 is apertured to permit access to the kerfed ends of the bolts 58 to permit adjustment thereof with respect to supporting plate 57 for alinement of the several units.

The sliding carriage formed by plate 57 and rods 56 may be operated in any suitable manner and, as illustrated, the operating mechanism is substantially as shown in Fig. 1. The ends of rods 56 are joined by a yoke 59 that is threaded to receive an operating screw 60 that is mounted in a strap 61 and carries a knob or other operating device 60'.

The coil assembly may be of the type previously described or, as illustrated, the coil forms 62 may have end plugs 63 which receive screws 64 securing the same to the circular and flanged mounting caps 65. Within the flange is mounted a condenser comprising plates 66, 67, which are insulated from each other and from the mounting cap by mica 68. A bolt 69 extends through cap 65 and carries an adjusting nut 70 which is accessible through openings 71 in the box cover plate 55 when the cap is secured thereto by screws 72. The tubular shields 73 for each coil unit have a frictional fit with the flanges of the mounting caps 65. An arcuate portion of the mounting cap 65 is cut away, and an insulating plate 74, carrying terminals 75, is secured over the cut-out portion.

Preferred types of electrical circuit arrangements for iron-tuned units are shown in Figs. 18 and 19.

The illustrated radio receiver includes two carrier wave amplifier tubes 80 and a detector tube 81, and the couplings to and between the tubes comprise iron-tuned transformers which are units of a gang assembly, such as one of those described above. The transformer windings are of relatively fine wire, wound turn for turn on the coil forms and connected in the same sense, thus providing a substantially unity coupling between the primary P and secondary S.

It will be noted that the primary winding P of transformer T' of the input stage is connected between ground and the control grid, the collector system being also connected to the grid. The condenser C is connected across the secondary S, and the low potential (carrier frequency) terminal of the secondary is connected to the tube cathode and, through a condenser C', to ground.

The plate circuits of the carrier wave amplifiers include the primary windings P of the transformers $T^2$ and $T^3$, respectively. The secondary windings S are shunted by relatively fixed condensers C, the terminals of the winding S of the transformer $T^2$ being connected to ground and, through a coupling condenser $C_c$, to the high potential terminal of the corresponding winding S of the input transformer $T^3$ of the second carrier amplifier 80. Winding P of transformer T³ is connected between ground and the control grid of the tube, and winding S is shunted by a condenser C. As with the input stage transformer, the low potential windings of transformer T³ may be connected through a condenser C'.

For amplification control, the cathodes of tubes 80 are joined and connected to ground through a variable cathode bias resistor R. In the detector stage, the secondary S, shunted by condenser C, is connected between control grid and ground, and a bias resistor R' is connected between ground and the cathode.

The screen grid circuits include resistances R² which affect the "efficiency" of the screening of the amplifiers by placing the screen grids at a carrier wave potential different from that of their cathodes, i. e., ground potential. As the impedance of the resistances R² is substantially independent of the carrier frequencies, the degree of "unshielding" is substantially constant for all frequencies. As regeneration is a function of frequency, and is greater at higher frequencies, the magnitude of resistances R² may be so chosen as to provide appreciable regeneration at the high frequency end of the band, thus increasing the gain and selectivity at the higher signal frequencies.

Due to the substantially unity coupling provided between the twin windings of each unit, the primary winding may be included in the direct current or biasing circuit between control grid and cathode, instead of the tuned secondary winding which is the customary arrangement. The high capacity between the twin windings, supplemented if desired by the additional capacities C', places the resonant secondary windings effectively in the alternating current input circuits of the tubes. With this arrangement, the bias resistor R is shunted by the high distributed capacity of the transformer and the added condenser C', when one is used, may be of a magnitude considerably smaller than is required in the previously known input circuits.

When apparatus such as shown in Figs. 4 to 6 is employed in the receiver, the condenser C is provided by the plates 24 and 26, and the condenser C' comprises the lower fold of plate 24 and the flange of the mounting plate 14. As there is no direct current drop across condenser C', the dielectric or insulating plate 29, Fig. 4, may be economically formed of impregnated paper. The insulating strips 25 of condenser C are preferably of mica, however, to reduce the losses in the resonant circuit.

The two tuned circuits between amplifiers 80 are provided to increase the selectivity, and this arrangement is to be preferred where selectivity is essential and the gain is not particularly important.

As shown in the fragmentary diagram, Fig. 19, the transformer coupling between tubes 80 may take the form of a transformer having a primary winding P in the plate circuit of the first tube, a secondary winding S connected between the control grid and ground, and a tertiary winding having its low potential terminal connected to the cathode side of a cathode bias resistance R.

The tertiary winding is shunted by a condenser C, and this resonant circuit is effectively connected between the control grid and cathode by the high distributed capacity between windings S and S'. As in the transformers previously described, this high distributed capacity is obtained by winding the coils S and S' turn for turn, and in close contact, along the coil form. The distributed capacity will, as suggested above, usually be sufficient to avoid the necessity of a separate physical condenser shunting the bias resistor R.

While the coupling circuits shown in Figs. 18 and 19 include transformers, it will be understood that the mechanical constructions described above are equally useful with tuned impedance couplings.

The rigid mounting of the coil units on the chassis is particularly advantageous as it permits the use of short and definitely located leads between the coils and the other circuit elements. The condenser elements which shunt the tuned inductances may be mounted directly on the coil supports, thus eliminating the leads required when movable coils are associated with condensers fixed to the chassis.

It will be apparent that the accompanying drawings are but illustrative of typical embodiments of the invention, and that various changes may be made in the several parts, their shape, size and relationship without departing from the spirit of the invention as set forth in the following claims.

I claim:

1. A ganged assembly of circuits of the variable inductance type comprising a rigid shield box having means providing a plurality of sets of axially spaced bearings, rods slidably mounted in each of said sets of bearings, a frame member rigidly secured to said rods, tuning armatures mounted on said member, inductances fixed to said box and cooperating with the respective tuning armatures, and shield cans for the several inductances.

2. The invention as set forth in claim 1, wherein said armatures are adjustably mounted on said frame member and said box is apertured to permit adjustment of said armatures on said frame.

3. In a tuning device of the class described, a rigid chassis of box form, a plurality of mounting plates supported on said chassis, coil units mounted on the respective plates, a shield can attached to each mounting plate for shielding the associated unit, a carriage including a plurality of rods slidably supported on and extending through said chassis, and tuning armatures mounted on said carriage.

4. A coil assembly comprising a mounting plate, a coil form supported by said plate, a strip of insulation on said plate, a resilient condenser electrode spaced from said plate by said insulating strip, means for moving said electrode toward said plate, said electrode and plate forming a condenser adapted to be shunted across a winding on said coil form, said electrode being in the form of a plate bent upon itself, a conducting strip between and insulated from the opposed folds of said bent plate electrode, whereby said bent plate electrode and said conducting strip form a second condenser.

5. A transmission system of the type including a plurality of circuits each comprising a fixed capacity and a variable inductance, and means for simultaneously tuning said circuits by a unitary control to maintain substantially perfect syntonism between all circuits at all positions of the tuning control, characterized by the fact that said variable inductances bear a constant ratio other than unity to each other for all positions of the tuning control.

6. A transmission system including a plurality of circuits each including a fixed capacity and an inductance, the inductance of one circuit being unequal to the inductance of another circuit, and adjustable means for simultaneously varying the inductances of all of said circuits over a frequency band, said tuning means maintaining a constant ratio between said unequal inductances throughout the tuning range of said circuits.

7. In a transmission system, a plurality of tuned circuits each comprising a fixed capacity and an inductance coil, armatures displaceable with respect to said coils to tune the several circuits over a frequency band, means connecting said armatures for simultaneous adjustment, means for adjusting said circuits to syntonism at one point in the tuning range, and independent means for adjusting the rate of change of inductance for each coil.

WILLIAM D. LOUGHLIN.